United States Patent

[11] 3,585,504

[72] Inventors Howard Mumford;
Marcus P. Barton, both of Taplow, England
[21] Appl. No 765,436
[22] Filed Oct. 7, 1968
[45] Patented June 15, 1971
[73] Assignee British Telecommunications Research Limited
Taplow, England

[54] ELECTRICAL SIGNALLING SYSTEM
7 Claims, 11 Drawing Figs.

[52] U.S. Cl. .......... 325/30, 325/38A, 178/68, 325/163
[51] Int. Cl. .......... H03k 7/02, H03k 7/06
[50] Field of Search .......... 325/30, 163, 38A; 178/67, 66, 68, 7.1, 88, 6

[56] References Cited
UNITED STATES PATENTS
3,244,808 4/1966 Roberts .......... 178/6
3,430,143 2/1969 Walker .......... 325/30

*Primary Examiner*—Robert L. Griffin
*Assistant Examiner*—Kenneth W. Weinstein
*Attorney*—Young & Thompson

ABSTRACT: The invention is concerned with bandwidth and/or time compression of data signals, particularly facsimile signals having two levels only. The basis of the invention is to convert the binary facsimile signals into a multilevel signal. One method involves allocating of alternate levels of the multilevel signal to each of the two binary signal levels and arranging for transitions of the multilevel signal to be in the same direction when the corresponding binary transitions are close together. Another arrangement exploits the fact that the majority of white plus black run-length produced by scanning printed text are more than twice the length of the majority of black run-lengths. In this arrangement, alternate transitions are transmitted in different panels.

INVENTORS
HOWARD MUMFORD
MARCUS PAUL BARTON
BY Young + Thompson
ATTYS.

INVENTORS
HOWARD MUMFORD
MARCUS PAUL BARTON
BY Young & Thompson
ATTYS.

INVENTORS
HOWARD MUMFORD
MARCUS PAUL BARTON
BY Young + Thompson
ATTYS.

INVENTORS
HOWARD MUMFORD
MARCUS PAUL BARTON
BY Young + Thompson
ATTYS.

INVENTORS
HOWARD MUMFORD
MARCUS PAUL BARTON
BY Young & Thompson
ATTYS.

INVENTORS

HOWARD MUMFORD

MARCUS PAUL BARTON

BY Young & Thompson

ATTYS.

ELECTRICAL SIGNALLING SYSTEM

This invention relates to bandwidth and/or time compression of data signals and more particularly to compression of facsimile signals.

Facsimile signals may be produced by scanning an original to be transmitted with a photoelectric reading head. The output from the photoelectric reading head is transmitted and used at the receiving end to control the intensity of a light source which is scanned over photosensitive material in synchronism with the reading head.

Signals produced by scanning printed text will clearly have two levels only. Photographic material may be arranged also to produce two level signals by use of the screen process. One of the factors determining the quality of the image produced is the line density of the scanning pattern. It is generally accepted that the resolution along a scanning line should be equal to the line pitch; thus the line density determines the product of bandwidth and transmission time required.

It is an object of the invention to provide bandwidth-time compression system for transmission of facsimile signals derived from an original, such as one comprising printed text and pictures produced by the screen process, in which there are no intermediate tones between the color of the image (in the case of a printed original, the color of the ink) and the color of the paper. It will be realized that, in these circumstances, the condition of any part of the image can be represented by a binary signal.

According to the invention, in an electrical signalling system for transmission of a facsimile signal derived from an original having no intermediate tones, the facsimile signal is a binary signal of which one condition represents the image and the other condition represents the background and modulating arrangements are provided for modulating a carrier signal with the binary signal in such a way that alternate modulation levels correspond to respective conditions of the binary signal and the change of modulation at a transition of the facsimile signal is arranged to be in the same direction as the change of modulation at the previous transition if the interval between said two transitions is less than a predetermined time unless more than a predetermined number of such short intervals between transitions have occurred in succession.

The invention will be more readily understood from the following detailed description with reference to the accompanying drawings in which.

In the following description it will be assumed that the image (or ink) color is black and the background color is white.

Figure 1:
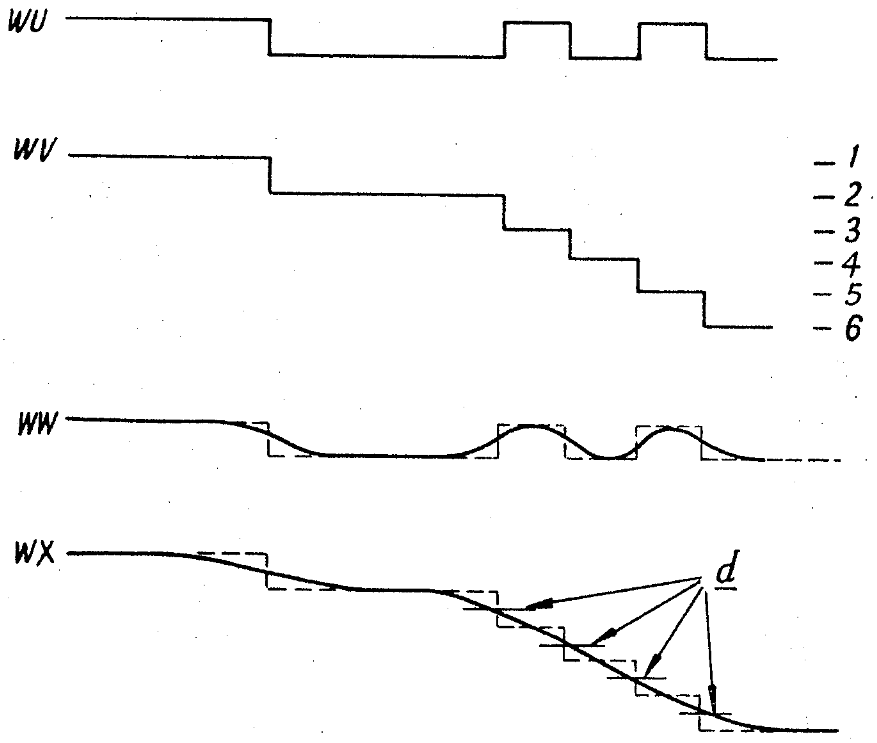
FIG. 1 shows waveforms illustrating the so-called "staircase" method of transmitting facsimile signals.

An arrangement in accordance with the invention employing a six level signal uses the so-called "staircase" method. The arrangement is that levels 1, 3 and 5 are used to denote black, while signals on levels 2, 4 and 6 denote white. Referring to FIG. 1, waveform WU is the waveform of a facsimile signal and waveform WV is the corresponding six level signal. Waveform WW shows the corresponding signal which would be received if waveform WU were transmitted in the ordinary way and waveform WX shows the received six-level signal, the various decision levels being shown at *d*. It will be seen that the bandwidth required to transmit waveform WX is considerably less than that for waveform WW. It will be realized that if level 1 or level 2 is reached during the scanning of a segment of fine detail a waveform similar to the right-hand part of waveform WW will be produced. If this is transmitted on the narrow bandwidth required for a waveform such as waveform WX, distortion will occur.

In order to avoid this situation as far as possible, long run-lengths are generally transmitted using levels 1 and 2 and short runs levels 2 to 5. There are likely to be many more long runs than short runs in the facsimile signal. In a typical case a succession of long runs will be followed by a short run on level 2 or 3 depending upon whether the last long run occupied level 1 or level 2. If another short run follows the previous one, this will occupy level 3, or level 4. A third successive short run will occupy level 4 or level 5. A forth successive short run will occupy level 5 or level 6. If it occupies level 6, distortion will occur. A six-level system is therefore restricted to handling three successive short runs only without distortion. In the event of a long run after any one of the short runs, assumed in this example, the direction of the next transition is such as to take the signal back towards level 1 and give the largest available number of steps for any further sets of short run-lengths which may occur later. The effect of this is that except in regions of fine detail the signals are in general transmitted either on level 1 or level 2.

Figure 2:
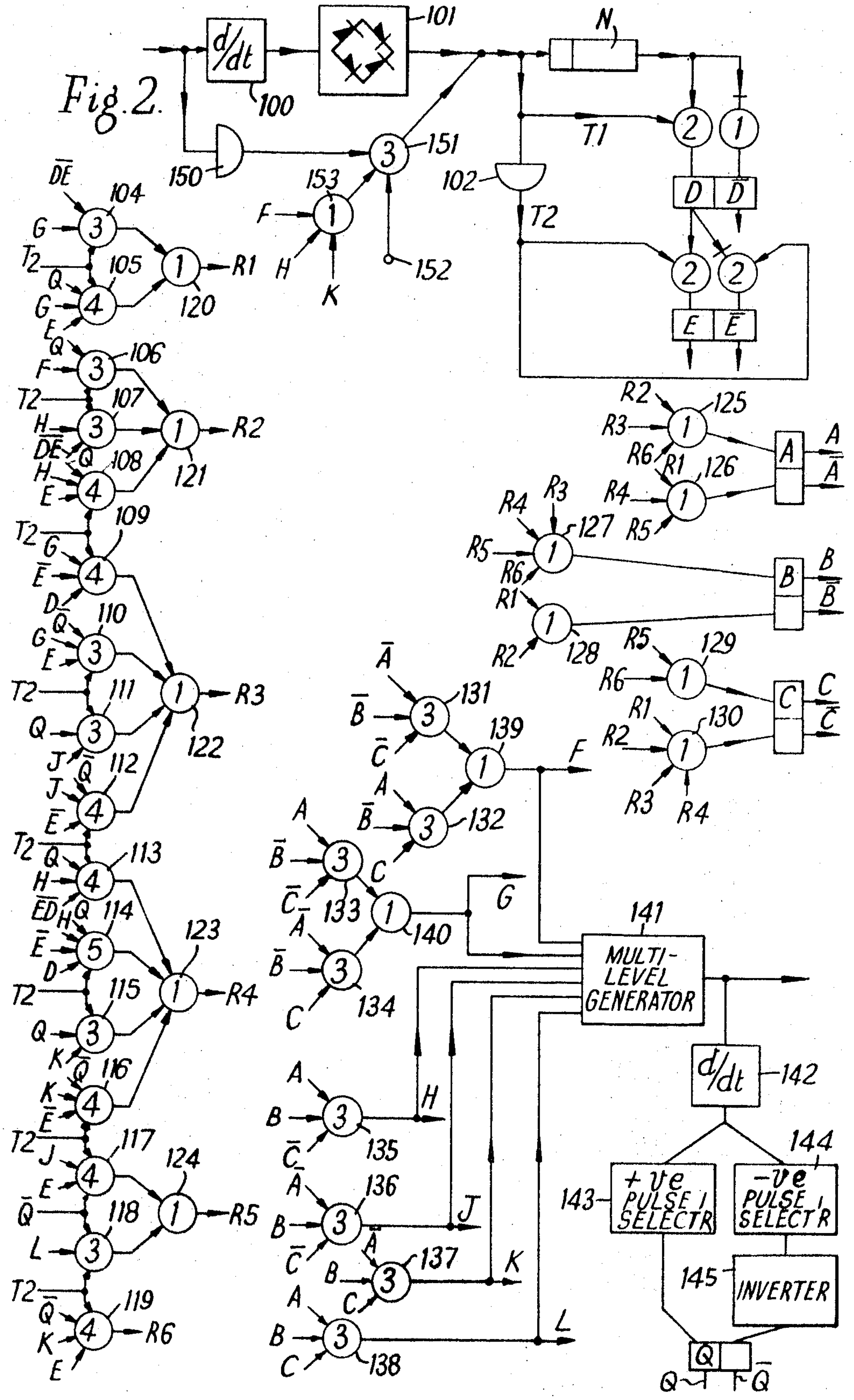
FIG. 2 is a schematic diagram of a transmitter for use in accordance with the staircase method.

FIG. 2 is a diagram of the logic required at the transmitter in the "staircase" arrangement. Logic level 1 corresponds to positive and logic level 0 to negative input signals. A binary signal from the photocell is applied to a differentiator 100. The output of the differentiator 100, which comprises a positive pulse for each white-black transition and a negative pulse for each black-white transition, is applied to a full-wave rectifier 101 which gives a positive pulse at its output for each transition of the original signal.

The output from the full-wave rectifier 101 is applied to a beginning element N, which produces an output signal lasting for slightly less than a predetermined time Y for each input pulse. This action occurs independently of whether or not the last output signal is finished. The output of the full-wave rectifier 101 is also applied to a delay device 102 which produces a predetermined delay Y. The output of the beginning element N is connected to a toggle D which is arranged to be set on receipt of a pulse from the full-wave rectifier 101 if the beginning element N is also on and to be reset by the end of the signal from the beginning device N. The toggle D is connected to a toggle E which is arranged to be set if an output signal from the toggle D is still being received at the end of the delay period Y and to be reset if such output is not being received.

Figure 3:
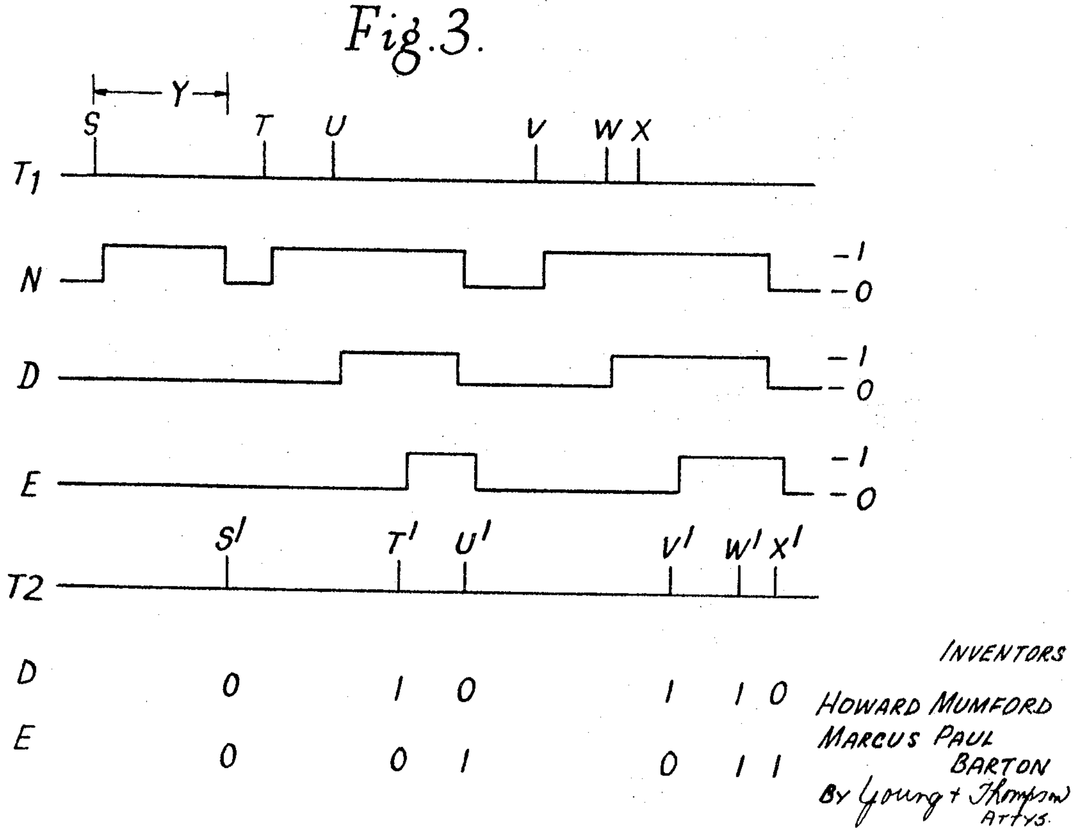
FIG. 3 is a waveform diagram illustrating the operation of the transmitter shown in FIG. 2.

Referring now to FIG. 3, the output T1 of the full-wave rectifier 101 consists of transitions S,T,U,V,W and X. The output T2 of the delay device 102 consists of corresponding pulses S′, T′, U′, V′, W′ and X′. Considering pulses S and S′, the delay signal from the beginning element N started by the former will finish by the time of occurrence of the latter. Toggle D which is reset by the end of a signal from the beginning element N will therefore be in the reset state at the time S′ indicating that the interval ST is longer than the predetermined time Y.

When one or more pulses arrive within a period Y, as for example pulses W and X following pulse V, the next following pulse W (which occurs before V′) sets toggle D into the set condition in which it remains when pulse V′ occurs indicating that the run length VW is shorter than the predetermined period Y The toggle D remains in the set condition at time W' indicating that run length WX is short The toggle D is reset at time X' indicating that the following run length is longer than the predetermined period Y The toggle E is set or reset at each pulse from the output of the delay device 102 so that it stores the condition of toggle D until the next transition time. Consequently the toggle E indicates whether the previous run was longer or shorter than the period Y The possible conditions of the toggles and the indications given thereby are shown in table I

TABLE I

| D | E | Next most recent run | Most recent run |
|---|---|---|---|
| 0 | 0 | Long | Long |
| 0 | 1 | Short | Long |
| 1 | 0 | Long | Short |
| 1 | 1 | Short | Short |

The level on which the signal is being transmitted during each run is indicated by the condition of three toggles A, B, and C. As these three toggles would give eight conditions, two are duplicated to avoid difficulties which would occur should the toggles accidentally become set in a disallowed condition. In normal operation only six of the eight conditions are used, one to denote each level. The significance of each condition is indicated in table II.

TABLE II

| Level | Toggle States | Output Signal |
|---|---|---|
| 1 | $\bar{A}\,\bar{B}\,\bar{C}$ or $A\,\bar{B}\,C$ | F |
| 2 | $A\,\bar{B}\,\bar{C}$ or $\bar{A}\,\bar{B}\,C$ | G |
| 3 | $A\,B\,\bar{C}$ | H |
| 4 | $\bar{A}\,B\,\bar{C}$ | J |
| 5 | $\bar{A}\,B\,C$ | K |
| 6 | $A\,B\,C$ | L |

The inputs to toggles A,B and C are provided by AND gates 104 to 119, connection being made by respective OR gates 120 to 125. The AND gates 104 to 119 combine the signals T2, D,E,Q,F,G,H,J,K and L to form signals R1 to R6. The signals R1 to R6 are operative via OR gates 120 to 130 to control toggles A,B and C. The operation is in accordance with the rules stated in table III in which U represents an upward transition, D a downward transition, L a run which is longer than Y and S a run which is shorter than Y. As shown in FIG. 2 and table II, the signals F,G,H,J,K and L are produced by combining the outputs from the toggles A,B and C in AND gates 131 to 138 and OR gates 139 and 140 and thus indicate the existing states of the toggles. Of the other inputs to the AND gates 104 to 119, T2 acts as a timing signal, D indicates that the most recent run was shorter than the period Y and $\bar{D}$ indicates that it was longer, E indicates that the next most recent run was shorter than the period Y and $\bar{E}$ indicates that it was longer, and Q indicates that the most recent transition was up and $\bar{Q}$ that it was down. The signals Q and $\bar{Q}$ are the set and reset outputs respectively of a toggle Q, the operation of which will be explained hereinafter.

TABLE III

| Sequence | Next most recent transition | Level before most recent transition | Run before most recent transition | Run after most recent transition | Most recent transition |
|---|---|---|---|---|---|
| 1 | U | 1 | L | L | 1–2 |
| 2 | U | 1 | L | S | 1–2 |
| 3 | U | 1 | S | L | 1–2 |
| 4 | U | 1 | S | S | 1–2 |
| 5 | D | 2 | L | L | 2–1 |
| 6 | D | 2 | L | S | 2–3 |
| 7 | D | 2 | S | L | 2–3 |
| 8 | D | 2 | S | S | 2–3 |
| 9 | U | 2 | L | L | 2–1 |
| 10 | U | 2 | L | S | 2–3 |
| 11 | U | 2 | S | L | 2–1 |
| 12 | U | 2 | S | S | 2–1 |
| 13 | D | 3 | L | L | 3–2 |
| 14 | D | 3 | L | S | 3–4 |
| 15 | D | 3 | S | L | 3–4 |
| 16 | D | 3 | S | S | 3–4 |
| 17 | U | 3 | L | L | 3–2 |
| 18 | U | 3 | L | S | 3–4 |
| 19 | U | 3 | S | L | 3–2 |
| 20 | U | 3 | S | S | 3–2 |
| 21 | D | 4 | L | L | 4–3 |
| 22 | D | 4 | L | S | 4–3 |
| 23 | D | 4 | S | L | 4–5 |
| 24 | D | 4 | S | S | 4–5 |
| 25 | U | 4 | L | L | 4–3 |
| 26 | U | 4 | L | S | 4–3 |
| 27 | U | 4 | S | L | 4–3 |
| 28 | U | 4 | S | S | 4–3 |
| 29 | D | 5 | L | L | 5–4 |
| 30 | D | 5 | L | S | 5–4 |
| 31 | D | 5 | S | L | 5–6 |
| 32 | D | 5 | S | S | 5–6 |
| 33 | U | 5 | L | L | 5–4 |
| 34 | U | 5 | L | S | 5–4 |
| 35 | U | 5 | S | L | 5–4 |
| 36 | U | 5 | S | S | 5–4 |
| 37 | D | 6 | L | L | 6–5 |
| 38 | D | 6 | L | S | 6–5 |
| 39 | D | 6 | S | L | 6–5 |
| 40 | D | 6 | S | S | 6–5 |

It will be seen that in the case of sequences 3, 4, 39 and 40, a short run is followed by a change of direction of transitions. This overloads the available bandwidth, causing distortion. Such conditions arise as a result of a considerable number of short run-lengths occuring in succession. For example, in the case of sequences 3 and 4, in which the next most recent transition was level 2 to level 1, the previous sequence must have been sequence 12 which inevitably produces an overload condition at the next transition. In turn, sequence 12 must have been preceded by a sequence 20. Consequently there must have been at least three short runs in succession. In the case of sequences 39 and 40, the corresponding previous sequence is sequence 32 and the corresponding next previous sequence is sequence 24.

The signals F,G,H,J,K, AND L are arranged to control a multilevel generator 141 which generates the output signal which is to be transmitted.

The output of the multilevel generator 141 is also connected via a differentiator 142 both to a positive pulse selector 143 and to a negative pulse selector 144. The output of the positive pulse selector 143 is connected directly to the set input of the toggle Q and the output of the negative pulse selector 144 is connected to the reset input of the toggle Q via an inverter 145. Consequently the toggle Q receives a set input signal on each occasion when the output signal from the multilevel generator 141 increases and a reset signal on each occasion when the output signal from the multilevel generator 141 decreases.

If, for any reason, a white run happens to be indicated by a black output, this condition will persist at subsequent transitions and black/white inversion will occur.

In order to prevent this, a security circuit comprising a delay device 150, producing a delay Y equal to that of the device 102, the output of which is connected, via a 3 input AND 151 gate, to the input of beginning element N Of the other two inputs to the AND gate 151, one is connected to a terminal 152, to which a continuous stream of pulses is applied, while the other is connected to the output of an OR gate 153 having inputs connected to the outputs F,H and K of gates 139, 135 and 137 respectively which produce output signals when a black run is being transmitted. If a white run of the binary signal, delayed by the device 150, coincides with a black run of the output signal, one of the pulses from the pulse stream on the terminal 152 is supplied to the beginning element N to simulate an additional transition, thereby reinverting the output signal.

With this arrangement, the transmission time for a double page is 2.8 minutes.

Figure 4:
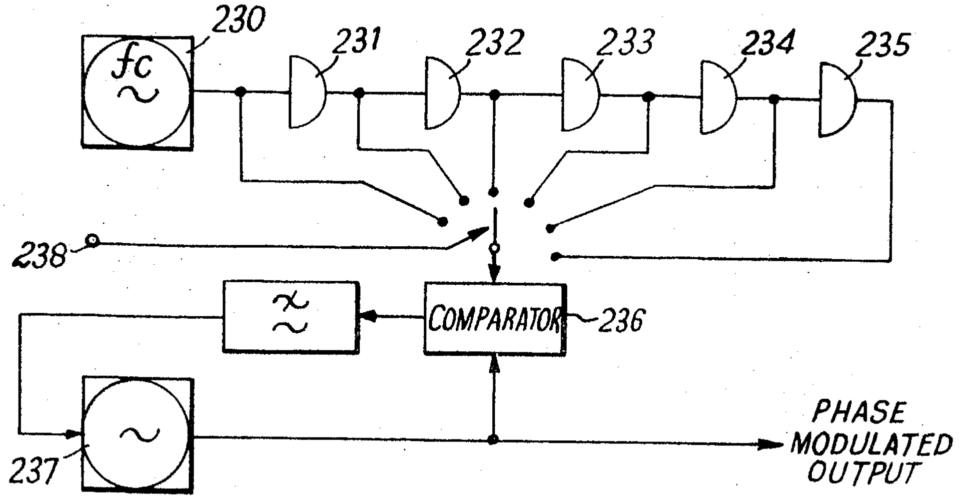
FIG. 4 is a block schematic diagram of a modulator for use in conjunction with a modification of the staircase method.
Figure 5:
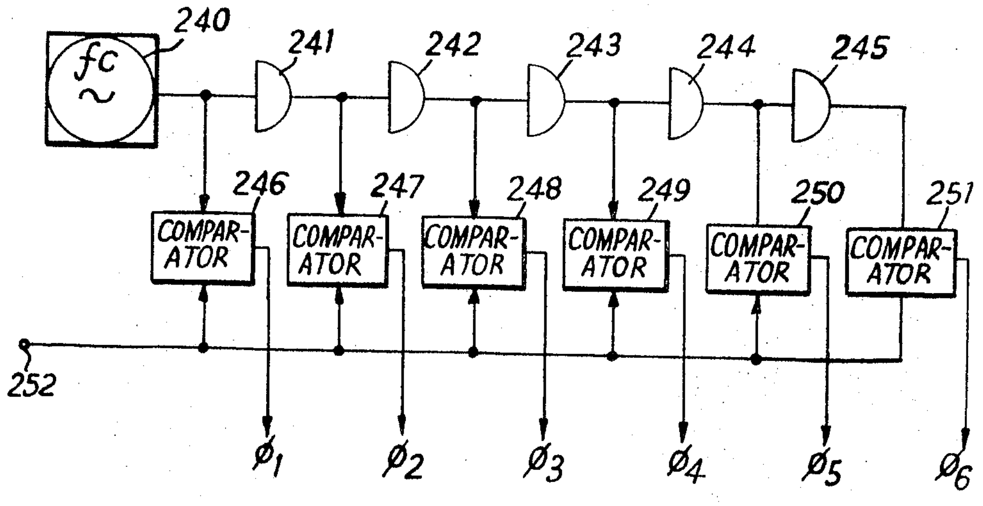
FIG. 5 is a block schematic diagram of a demodulator for use in conjunction with the modulator shown in FIG. 4.

An alternative method, which gives the same transmission time, involves the use of phase modulation instead of amplitude modulation. Six phases are used, the signal being delayed in phase by 60° for each transition. There is no need for a change of direction after a predetermined number of transitions since the phase of the carrier may be retarded without limit. FIG. 4 shows the circuit at the transmitter. The output of a master oscillator 230 is connected to a series of delay devices 231,232,233,234, and 235 each of which gives a delay of 60° at the frequency of the master apparatus. Arrangements are provided for selectively connecting the output of the master oscillator direct or via one of more of the delay devices 231, to 235 to a comparator 236 to control the frequency of a slave oscillator 237. The selective connection is the equivalent of a rotary switch which is arranged to be stepped through one position for each transition of the facsimile signal which is applied to the terminal 238. The demodulating arrangements of the receiver are similar. In FIG. 5 the output of a master oscillator 240, which is synchronized with the master oscillator 230, is connected to a series of five delay devices 241—245 each of which gives a delay of 60°. 245 at The master oscillator 240 may be replaced by a direct connection on the transmission path to the oscillator 230. Alternatively, if timing arrangements are provided in connection with the transmission system, the oscillators 230 and 240 may be controlled by these arrangements. The direct output of the master oscillator 240 and of each of the delay devices 241—245 is respectively connected to a comparator 246—251. The other input of each comparator is connected to terminal 252 on which the incoming signal is received. When the incoming signal is in phase with the signal at a comparator derived from the oscillator 240 such comparator produces an output. It will be realized that the output of one of the comparators only is energized at any time.

Another approach depends on the fact that, although the distance between a transition from black to white and the corresponding transition from white to black or vice versa may be relatively short, the distance between adjacent black to white transitions is, in the majority of cases, more than twice this distance. The same is true of adjacent white to black transitions. In other words the majority of black/white run-lengths and of white/black run-lenths are more than twice as long as either the majority of white run-lengths or the majority of black run-lengths. This is because it is relatively unusual for a short black run to be followed by a short white run and vice versa.

Figure 6:
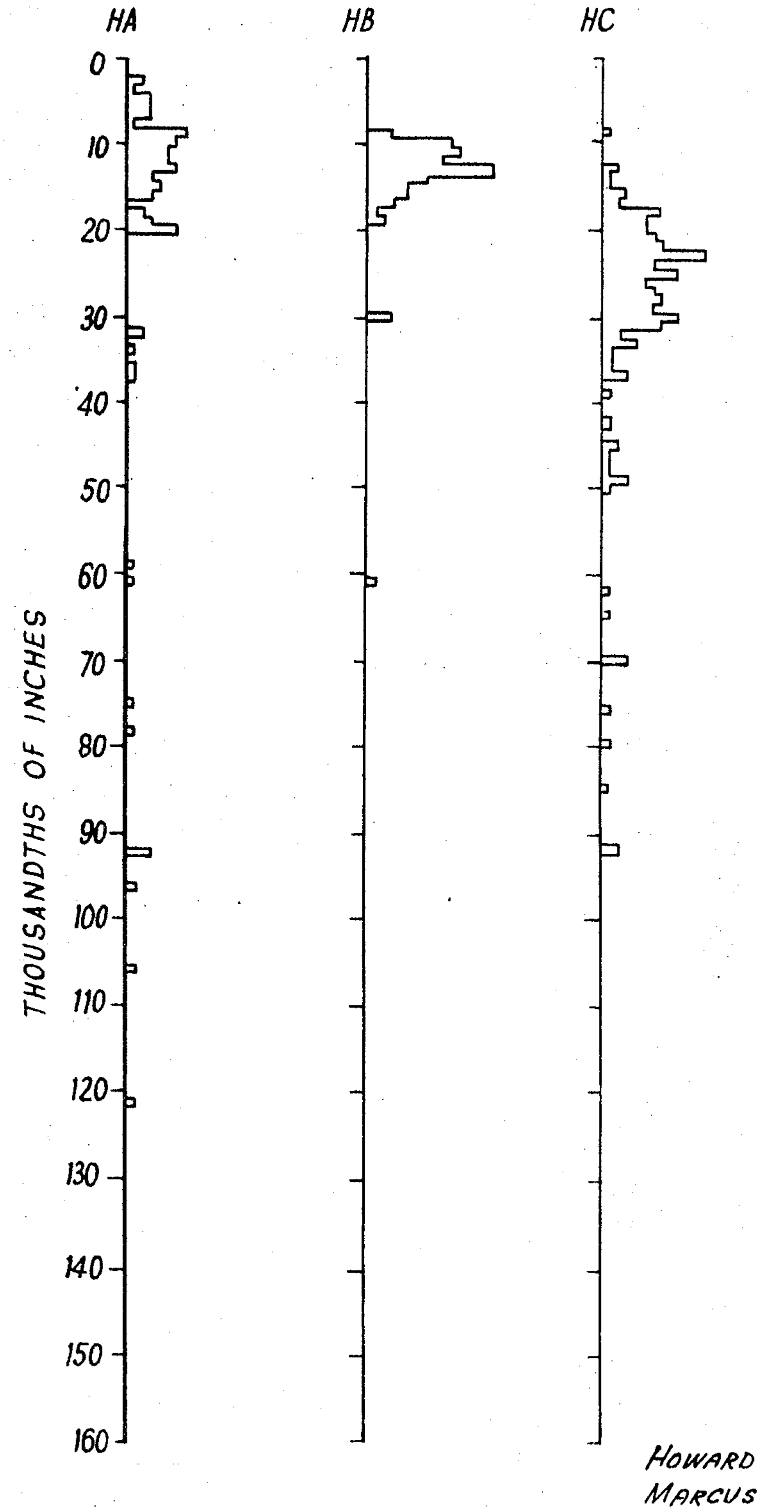
FIG. 6 shows histograms illustrating typical run-length distributions in newsprint.

FIG. 6 comprises three histograms showing the run-length distributions for ionic type newsprint. Histogram HA is for white runs, histogram HB for black runs and histogram HC for white plus black runs. From these it will be seen that although there is a significant number of white runs of less than five-thousandths of an inch in length, all white plus black runs are at least fourteen-thousandths of an inch, apart from one group of nine-thousandths of an inch. The nine-thousandths of an inch black plus white runs are produced by the serif of the lower case letter *a*. Degradation of this is frequently considered to be acceptable.

Figure 7:
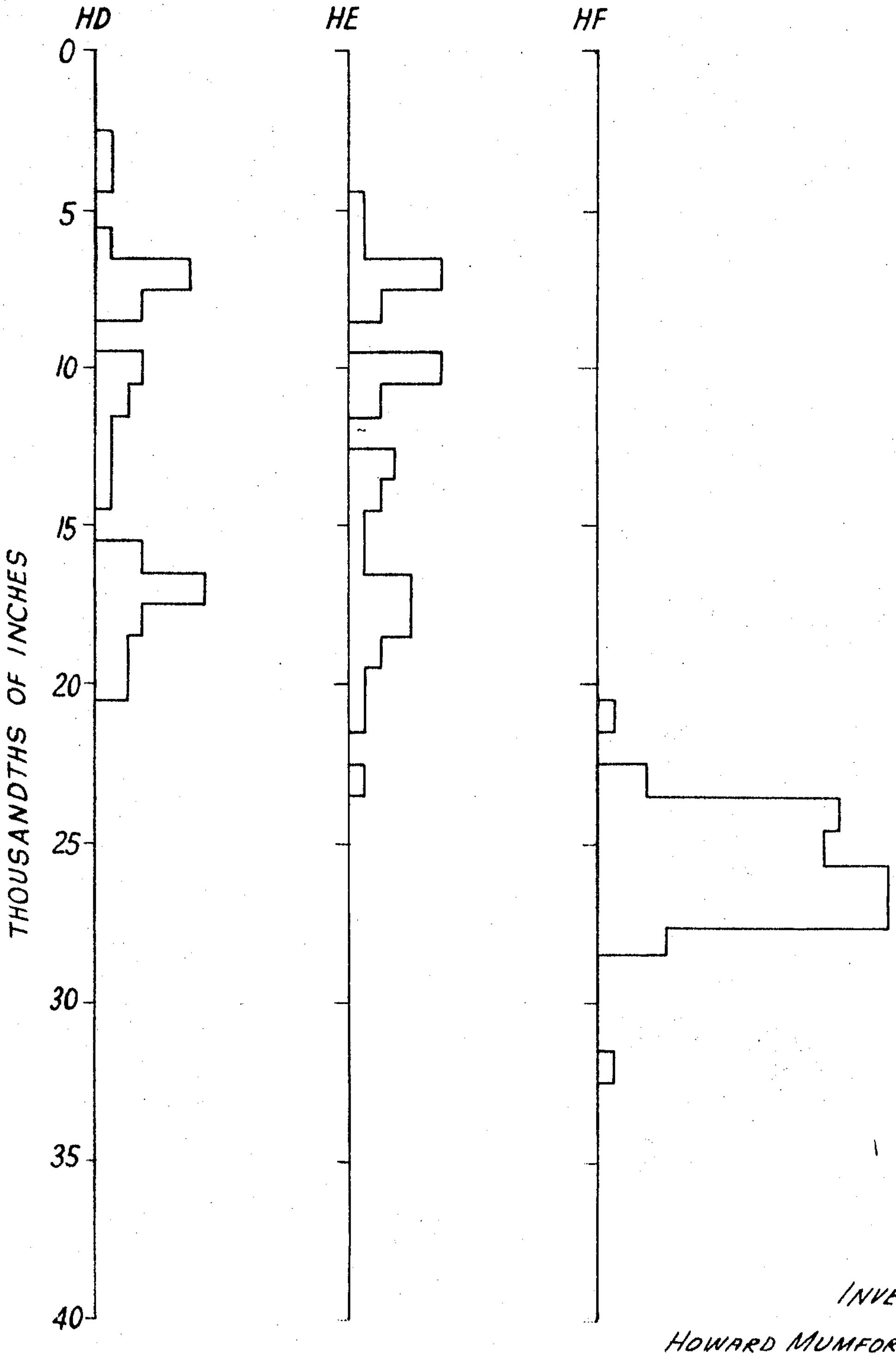
FIG. 7 shows histograms illustrating typical run-length distributions in newspaper pictorial material.

FIG. 7 shows corresponding histograms HD, HE and HF of run-length distributions in pictures. From these it will be seen that while there are white run-lengths of less than five-thousandths of an inch, the shortest white plus black run-lengths are at least twenty-thousandths of an inch long.

From these histograms it will be seen that, provided degradation of the serif of the lower case letter *a* is acceptable, the shortest white plus black run-length which must be accommodated is thirteen-thousandths of an inch.

Figure 8:
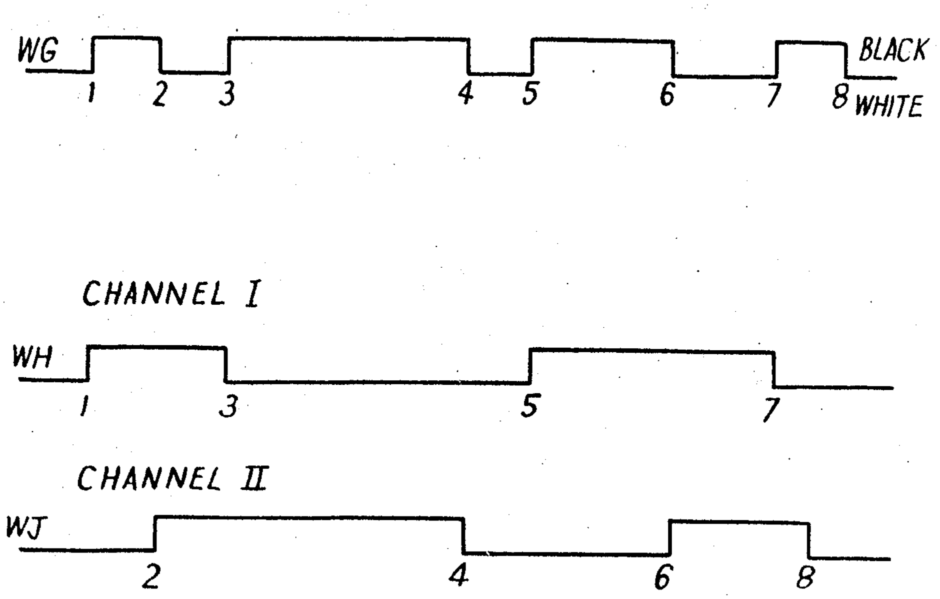
FIG. 8 shows waveforms illustrating the transmission of facsimile signals using a two channel system.

One way of taking advantage of this when transmitting facsimile signals is to transmit signals representing alternate transitions in different channels. Referring to FIG. 8 waveform WG is a typical facsimile waveform. Transitions 1, 2 and 3, in which the length of the black plus white run is not greater than twice that of either the black run or the white run are usually produced by the serif of the lower case letter *a*. Occasions when this occurs and unacceptable degradation takes place are rare. For all other transitions, the black plus white run-length is greater than either twice the minimum black run-length or twice the minimum white run-length. The white/black transitions are transmitted on channel I and the black/white transitions on channel II. Waveforms WH and WJ are the waveforms transmitted on channels I and II respectively. It will be seen that, apart from the half-wave between transitions 1 and 3 in channel I, the shortest pulse length in either channel is more than twice the shortest of the original waveform WG. Consequently, assuming that the same bandwidth is available to transmit channels I and II together as would be available to transmit the basic waveform WG, the waveform can be transmitted faster in the two channel form. Statistical calculations indicate that while 10.4 minutes are required to transmit a double page of newspaper print on a 48 Kc./s. bandwidth if the facsimile waveform is transmitted as such, a double page can be transmitted in 5.5 minutes, if the available bandwidth is divided into two channels and alternate transitions are transmitted in different channels.

With certain types of original, a further saving may be obtained if four channels are used, successive transitions being transmitted in different channels so that each channel transmits a quarter of the total number of transitions. However in the case of newspaper print, it has been found there is a significant number of white plus black plus white plus black runs which are not greater than twice the shortest white plus black runs. Consequently no additional saving can be made in this case.

Figure 9:
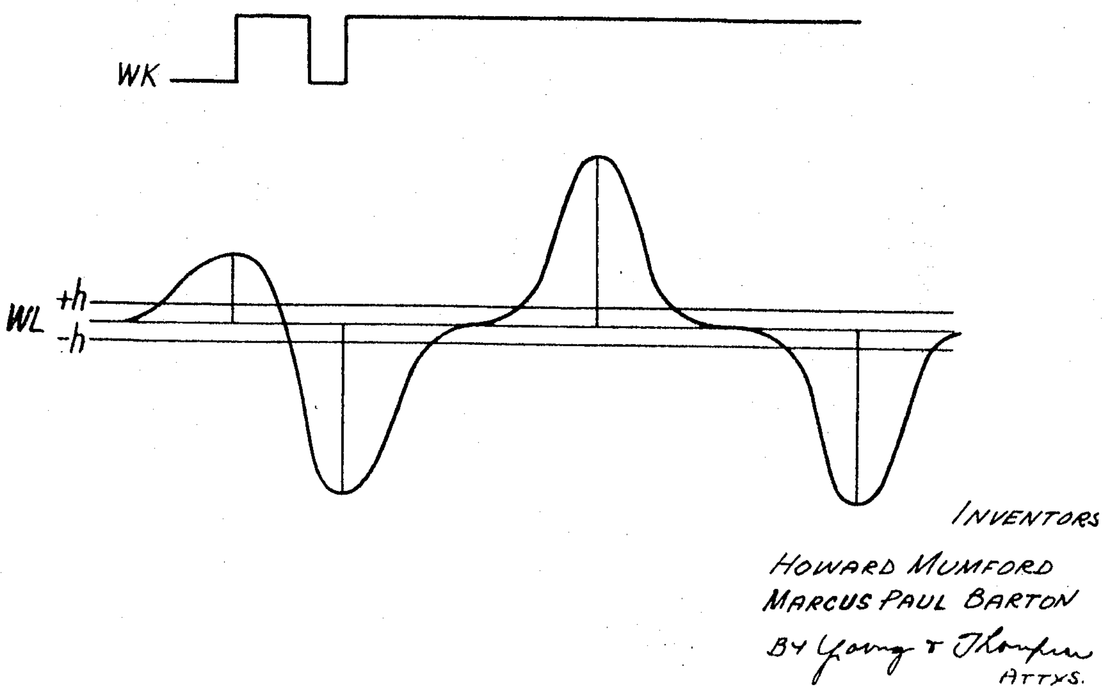
FIG. 9 shows waveforms illustrating the transmission of facsimile signals using a pulse-amplitude modulation system.

Another method of transmitting facsimile signals is by pulse-amplitude modulation of the black run-length. The positions of the pulses correspond to successive white-black transitions. In certain circumstances very long black runs, up to full page width, may be encountered. In these circumstances the maximum allowable pulse amplitude will be insufficient to define the whole of the black run. The first pulse defining the long black run will therefore be given maximum amplitude. This will be followed by pulses of maximum allowable amplitude which define further successive segments of the black run until the last one, which may be of an amplitude sufficient to define the remaining portion of the black run. This is however subject to the black run not being followed by a short white run when the action described below will be taken. In order to avoid the possibility of moire effects with picture material, the run-length corresponding to maximum pulse height, is arranged to be a little longer than the distance between adjacent dots of the picture screen, in the direction of scanning. The range of black run-lengths to be transmitted will therefore be from zero to this predetermined length. FIG. 9 shows a facsimile waveform WK and the corresponding coded signal (waveform WL). Pulse positions are indicated by transmitting alternate pulses in opposite senses so that there is a zero crossover between them. In order to maintain this crossover during short black runs, it is arranged for a black run of zero length to be indicated by a threshold pulse height *h* of 20 percent of the maximum. It will be seen that the maximum frequency to be transmitted is half the frequency of repetition of white/black transitions. With this arrangement, a double page can be transmitted on a 48 kc./s. bandwidth in 5.15 minutes.

Figure 10:
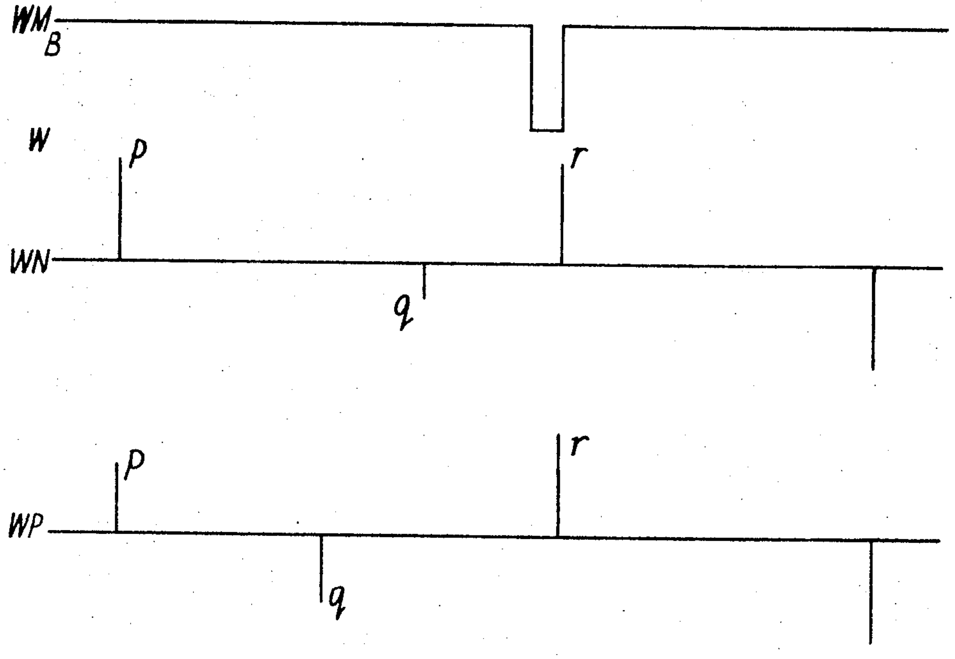
FIG. 10 shows waveforms illustrating a modification of the system described with reference to FIG. 4.

Referring to FIG. 10, the pulse-amplitude modulation system can fail when a short white run follows a long black run, as shown by waveform WM. Waveform WN is that of the pulse-amplitude-modulated signal. The long black run is indicated by a series of pulses of maximum amplitude of which the last $p$ is shown, followed by a pulse $q$ indicating the length of the remainder of the run. Since this remainder may be very small, the pulse $r$ indicating the start of the black run next following the short white run may itself follow very closely on the preceding pulse. This can lead to intersymbol interference.

The problem can be overcome in either of two ways. The first of these is to arrange for the amplitude of the pulse $p$ next but one before the white run to be reduced rather than that of the pulse $q$ immediately proceeding the white run. The latter pulse is therefore transmitted earlier and with a larger amplitude as shown in waveform WP. If this system is adopted, it is sometimes advantageous to transmit pulses indicating the length of the white runs rather than the length of the black runs since the minimum white run-length is about three times the minimum black run-length. MOdification of the last two pulses associated with a long run would therefore be required less frequently.

The other alternative is to invert the meaning of the line signal during long runs. Thus, for example if pulse amplitude initially indicates the length of black runs, inversion occurs during the first black run greater than a predetermined length and the amplitudes of the pulses would then indicate the length of white runs. This continues until a long white run caused similar reinversion. This arrangement can only be used when noise impulses of similar magnitude to the signals are unlikely since a single noise impulse of sufficient magnitude could cause inverted reproduction.

Figure 11:
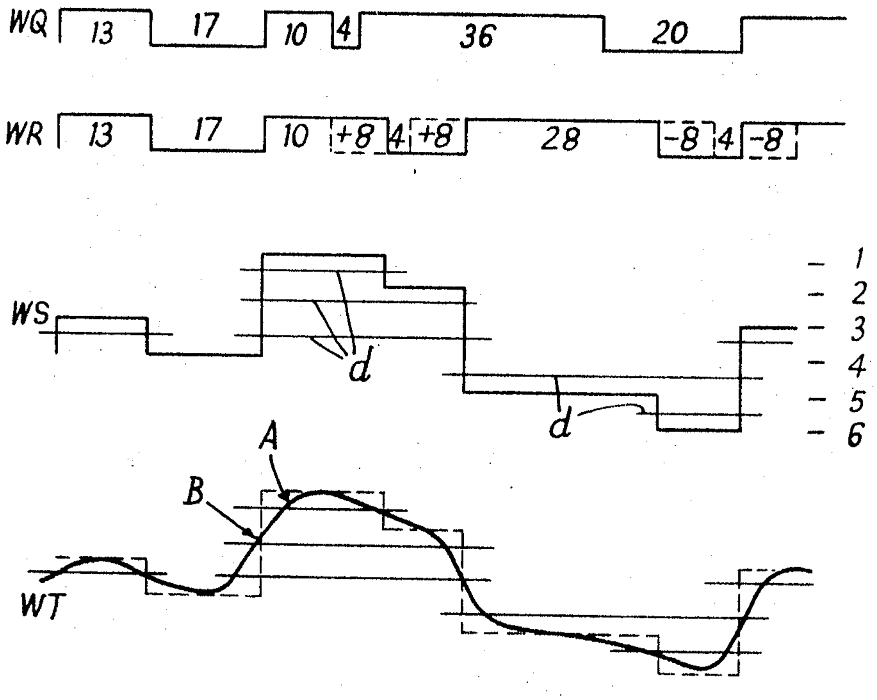
FIG. 11 shows waveforms illustrating the transmission of facsimile signals using a run-length modification system.

An alternative arrangement for transmitting facsimile signals operates on the principle of shortening; or lengthening the run-lengths so that they are within a predetermined range. If a run-length is below a specified minimum length then a fixed compensation length is added to raise the run-length above the minimum. The addition of this fixed amount delays the whole of the following message. In order to avoid the delay in the message continually increasing, the compensation length is subtracted from those run-lengths which are longer than a predetermined maximum length. This maximum length must be not less than the sum of the minimum length and the compensation length which is added or subtracted. This is illustrated in FIG. 11. Waveform WQ is a typical facsimile signal. It is assumed that the minimum run-length which occurs is four-thousandths of an inch and the minimum length which can be transmitted is twelve-thousandths of an inch. The compensation length which must be added to run-lengths which are below the minimum which can be transmitted is therefore eight-thousandths of an inch. To recover the delay, eight-thousandths of an inch is subtracted from run-lengths which are twenty-thousandths of an inch long or longer. The resulting waveform is shown as waveform WR. The shortest run-length is now twelve-thousandths of an inch instead of four-thousandths of an inch and a message can be transmitted three times as quickly through a channel of given bandwidth. However to enable the receiver to recover the original signal, information is required as to whether or not the predetermined length of eight-thousandths of an inch has been added to or subtracted from each run length. In order to do this, a six-level signal is used. The instruction whether to shorten, lengthen or leave alone a particular run is denoted by the level at which it is transmitted as shown in table IV.

TABLE IV

| Signal level | Action at receiver |
|---|---|
| 1 | Shorten black |
| 2 | Shorten white |
| 3 | Leave alone black |
| 4 | Leave alone white |
| 5 | Lengthen black |
| 6 | Lengthen white |

Alternate runs are transmitted with opposite polarity as previously. The undistorted line signal is shown as waveform WS and the received signal which has been distorted by limiting the bandwidth is shown as waveform WT. It will be seen that considerable timing distortion of the points at which the waveform crosses the decision levels is likely, as shown at A for example.

Correct timing is obtained by determining the time at which the signal strength crosses the decision level $d$ midway between the levels on each side of a transition as shown at B.

With this arrangement and with the same bandwidth as with previous arrangements the transmission time per page is 5.6 minutes.

We claim:

1. An electrical signalling system for transmission of a facsimile signal derived from an original having no intermediate tones in which the facsimile signal is a binary signal of which one condition represents the image and the other condition represents the background, comprising: modulating means for generating a carrier signal modulated to one of a first plurality of alternate modulation levels if the binary signal is in one condition and modulated to one of a second plurality of modulation levels if the binary signal is in the other condition; timing means for determining whether each time interval between successive transitions between two conditions of the binary signal is less than a predetermined value; and control means responsive to the timing means for causing the change in modulation level at transition following a time interval less than said predetermined value to be in the same direction as the change of modulation level at the previous transition unless the modulation level is already at the highest or lowest modulation level of said first and second pluralities of modulation levels.

2. An electrical signalling system as claimed in claim 1, in which the means for generating a carrier signal is arranged to generate an amplitude modulated carrier signal.

3. An electrical signalling system as claimed in claim 1, said timing means including means for indicating both whether the time interval between the two most recent transitions is less than said predetermined value and whether the previous time interval between transitions is less than said predetermined value; said control means including means responsive to the timing means for causing the change in modulation level at a transition between intervals both of which are longer than said predetermined time to be in a direction towards a predetermined one of the highest and lowest modulation levels unless the modulation level before said transition is said predetermined modulation level; and said control means also including means for causing the change in modulation level at a transition after an interval longer than the predetermined time and before an interval shorter than the predetermined time to be in the direction of the highest modulation level if the modulation level before said transition is nearer to the highest modulation level.

4. An electrical signalling system as claimed in claim 3, including a delay device having a delay period equal to the predetermined time, a timing device responsive to each transition of the binary signal for producing an output signal which persists for a shorter period than the predetermined time, a first bistable device responsive to the timing device and arranged to take up a first state if an output signal from the timing device persists when a subsequent transition takes place and to take up a second state if the output signal from the timing device has terminated prior to such subsequent transition a second bistable device responsive to the first bistable device and arranged on each transition to take up a first state if the first bistable device is in its first state and to take up a second state if the first bistable device is in its second state, the means for generating a carrier signal being responsive to the first and second bistable devices.

5. An electrical signalling system as claimed in claim 1, including error detecting means for determining whether the state of the binary signal indicated by the modulation level of the carrier signal corresponds to the actual condition of the binary signal and gating means responsive to the error detection means and arranged to supply a signal which simulates an addition transition if an error is detected 6. An electrical signalling system for transmission of a facsimile signal derived from an original having no intermediate tone in which the facsimile signal is a binary signal of which one condition represents the image and the other condition represents the background, comprising modulating means for altering phase of the carrier signal by a predetermined increment equal to the product of the reciprocal of an even integral number greater than two and 360° in response to each transition between the two conditions of the binary signal, said modulating means comprising a plurality of serially connected delay devices equal in number to one less than said even integral number, each delay device having a delay period equal to the product of the reciprocal of said even integral number and 360°, and selective connections means having a plurality of inputs equal in number to said even integral number, a single output and stepping means for connecting each input in turn to said output and adapted to be advanced by one step responsive to each transition of the facsimile signal, one of said inputs being connected to the input of the first delay device and each of the other inputs being connected to the output of a respective delay device.

7. An electrical signalling system as claimed in claim 6, including demodulating means comprising an equal number of serially collected delay devices to the number of such devices in modulating means, each delay device having a delay period equal to that of a delay device in the modulating means, supply means for supplying a signal in phase with the unmodulated carrier to the input of the first delay device of the series of delay devices and a plurality of comparators, one greater in number than the delay devices, one comparator having one input connected to the output of the supply means and the other comparators each having one input connected to the output of a respective delay device, the other input of each comparator being connected to receive the incoming signal.